United States Patent [19]

Isayev et al.

[11] Patent Number: 5,284,625
[45] Date of Patent: Feb. 8, 1994

[54] CONTINUOUS ULTRASONIC DEVULCANIZATION OF VULCANIZED ELASTOMERS

[75] Inventors: Avraam Isayev; Jianhua Chen, both of Akron, Ohio

[73] Assignee: The University of Akron, Akron, Ohio

[21] Appl. No.: 78,519

[22] Filed: Jun. 16, 1993

Related U.S. Application Data

[63] Continuation-in-part of Ser. No. 902,074, Jun. 22, 1992, Pat. No. 5,258,413.

[51] Int. Cl.$^5$ ............................ B06B 1/00; C08F 2/56
[52] U.S. Cl. .................................... 422/128; 521/45.5
[58] Field of Search ................. 521/40, 40.5, 41, 41.5, 521/44.5, 45.5; 422/128

[56] References Cited

U.S. PATENT DOCUMENTS 4,168,295  9/1979  Sawyer ................................. 422/128
4,379,724  4/1983  Kashiwagi ........................ 521/46.5

FOREIGN PATENT DOCUMENTS 9105818  5/1991  PCT Int'l Appl. ................ 521/44.5

Primary Examiner—Paul R. Michl
Assistant Examiner—Olga Asinovsky
Attorney, Agent, or Firm—Oldham, Oldham & Wilson Co.

[57] ABSTRACT

This invention relates to a continuous ultrasonic method and apparatus for breaking the carbon-sulfur (C—S), sulfur-sulfur (S—S), and if desired, carbon-carbon (C—C) bonds in a vulcanized elastomer. It is well known that vulcanized elastomers having a three-dimensional chemical network, cannot flow under the effect of heat and/or pressure. This creates a huge problem in the recycling of used tires and other elastomeric products. Through the application of certain levels of ultrasonic amplitudes in the presence of pressure and optionally heat, the three-dimensional network of vulcanized elastomer can be broken down. As a most desirable consequence, ultrasonically treated cured rubber becomes soft, thereby enabling this material to be reprocessed and shaped in a manner similar to that employed with uncured elastomers.

14 Claims, 9 Drawing Sheets

CONTINUOUS ULTRASONIC DEVULCANIZATION OF VULCANIZED ELASTOMERS

This is a continuation-in-part of copending application Ser. No. 07/902,074 filed on Jun. 22, 1992 U.S. Pat. No. 5,258,413.

TECHNICAL FIELD

This invention relates to an improved apparatus and method for continuous recycling of vulcanized elastomers and thermosets. More particularly, this invention relates to a continuous ultrasonic method for breaking the carbon-sulfur (C—S), sulfur-sulfur (S—S), and if desired, carbon-carbon (C—C) bonds in a vulcanized elastomer.

BACKGROUND OF THE INVENTION

It is currently estimated that about 200,000,000 used tires are produced annually. After the useful lifetime of these tires has expired, they are commonly dumped in waste disposal sites, but frequently are discarded on vacant land and in lakes and rivers because the used tires have no value and, in fact, cost money to dispose of properly.

In years past, it was possible for waste disposal sites and reclaiming plants to burn the tires and recover the metal or to dump them at a landfill. However, with increasing public awareness of ecology and the state of the environment, both the State Environmental Protection Agencies and the U.S. Government Environmental Protection Agency, have sought to eliminate this form of air and land pollution.

The most common traditional method for handling waste materials has been to simply dump the waste on designated land areas thereby creating large and often hazardous dumps in which fires are frequent and runoff into water sources is routine. Not only are these dumps eyesores, they are environmental hazards to both the air and water. It is of no little consequence that while dumps or landfills have often been the cheapest short term way of handling waste material, the land which can be used for this purpose is rapidly running out. This is particularly true in the highly urbanized areas of the industrialized countries. This traditional method of disposing of waste does not allow for the recovery of materials.

A particular problem is found in the disposal of rubber based products, such as automotive tires, hoses and belts, all of which are comprised of natural or synthetic rubber reinforced with other materials such as metal belts and fibrous cords. These products have very little use after they have performed their original and/or primary task and therefore have generally discarded. It is acknowledged that a certain number of tires are used to build retaining walls, guards protecting boating and similar things where resistance to weathering is desirable. However, a far greater number of tires, belts and hoses are simply discarded to become eyesores and breeding grounds for insects and other pests. Burying is particularly ineffective since these materials resist decomposition and tend to work their way to the surface.

There have been many proposals for handling waste materials so as to recover the component products. Some of these included burning off the unwanted material to get at the fire resistant residues or metal substructure. While this may seem to be an answer, it ignores the fact that much useful material would be consumed in burning, that the incineration process itself would not be energy efficient and could release hazardous byproducts into the atmosphere. It also ignores the problem of what to do with the ashes.

Other approaches to material recovery have included rendering the waste material into smaller pieces and then forcibly removing the desirable components. This may be a very difficult task when one considers recovery of material from something such as a tire, which is produced to withstand much abuse without loss of function. Even rendering a tire into smaller pieces would still not enhance the recovery of the metal, fiber and rubber products thereof. Besides a great amount of energy would be consumed in rendering the tire into the smaller pieces.

Still other approaches have involved the use of chemicals to break down the materials into their components. However, these methods create chemical sludges and residues which are not only a nuisance, if not impossible to dispose of, but some chemical treatments are dangerous to both human life and the environment.

Still additional approaches have involved the extensive use of cryogenics to lower the temperature of the product to below the glass-transition temperature of the components thereof. The product at this lowered temperature is then crushed sufficiently to cause the components to release sufficiently to effect separation. However, this in an energy intensive process.

The application of ultrasonic waves to the process of devulcanizing rubber is a most recent field. In fact, traditional thinking in the field has indicated that rubber is vulcanized by ultrasonics rather than devulcanized. Okada and Hirano published in *Meiji Gomu Kasei*, 9(1), 14-21 (1987) that the ultrasonic vulcanization of rubber was achieved, and that process demonstrated in the laboratory.

Additionally, the use of ultrasound to activate rubber-based adhesives was discussed in *Kauch. Rezina*, (5), 31-2 (1983) where the bonding of rubber strips was described. The dynamic strength of the bonded rubber strips was found to increase with increasing ultrasonic activation time.

Again, the ultrasonic welding of composite polymers was discussed in *Svar. Proizvod.*, (7), 42-3 (1982) where the ultrasonic welding of carbon black-filled rubber was determined to proceed via crosslinking between rubber and the carbon black molecules.

The vulcanization of rubber and crosslinking of polymers by ultrasound is elaborated in DE 2,216,594 published Oct. 26, 1972, based on Japanese priority document JP 71-20736 dated Apr. 6, 1971 wherein ethylene-propylene rubber or polybutadiene rubber-natural rubber mixtures; or polymers, e.g. polyethylene containing vulcanization agents or crosslinking agents were vulcanized or crosslinked, respectively, by ultrasonic waves (500 kHz) in a bath containing cold water or silicone oil.

The application of continuous ultra-high frequency vulcanization to high polarity rubbers, such as chloroprene rubber or butadiene-nitrile rubber is described, *Rubber World*, 162(2), 59-63 (1970).

The only application of ultrasonic waves in a devulcanization mode is described in JP 62121741 (1987). A batch process was described wherein vulcanized rubber was reclaimed by devulcanization by 10 kHz to 1 MHz ultrasonic wave irradiation. The batch process required 20 minutes using 50 kHz ultrasonic wave at 500 watts.

The process was found to break carbon-sulfur bonds and sulfur-sulfur bonds, but not carbon-carbon bonds.

DISCLOSURE OF THE INVENTION

This invention relates to a continuous ultrasonic method for breaking the carbon-sulfur (C—S), sulfur-sulfur (S—S), and if desired, carbon-carbon (C—C) bonds in a vulcanized elastomer. It is well known that vulcanized elastomers having a three-dimensional chemical network, cannot flow under the effect of heat and/or pressure. This creates a huge problem in the recycling of used tires and other elastomeric products. It was unexpectedly found that through the application of certain levels of ultrasonic amplitudes in the presence of pressure and optionally heat, the three-dimensional network of vulcanized elastomer can be broken down rather quickly. As a most desirable consequence, ultrasonically treated cured rubber, in the presence of pressure and optionally heat, becomes soft, thereby enabling this material to be reprocessed and shaped in a manner similar to that employed with uncured elastomers.

It is a first object of this invention to detail a continuous process for the devulcanization of vulcanized elastomers.

It is a second object of this invention to detail a continuous process for the devulcanization of vulcanized elastomer particles in which the carbon-sulfur (C—S), sulfur-sulfur (S—S), and if desired, carbon-carbon (C—C) bonds in vulcanized elastomers are broken.

It is a third object of this invention to detail a continuous process for the devulcanization of vulcanized elastomers which uses ultrasound.

It is a fourth object of this invention to detail a continuous process for the devulcanization of vulcanized elastomers which uses ultrasound to devulcanize rubbers in the order of seconds or less.

It is a fifth object of this invention to detail an apparatus effective for the continuous devulcanization of vulcanized elastomers through a die exit bore populated with an ultrasonic horn.

It is a sixth object of this invention to detail an apparatus effective for the devulcanization of vulcanized elastomers through a plurality of die exit bores, each populated with an ultrasonic horn.

It is a seventh object of this invention to provide a continuous process which is capable of breaking a three-dimensional network of highly crosslinked polymers by the application of ultrasonic waves, pressure and optionally heat, to the crosslinked polymer.

It is an eighth object of this invention to provide an improved ultrasonic horn and die configuration wherein the ultrasonic horn is positioned internal of the die to minimize the amount of oxidative degradation which occurs during the devulcanization.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

Figure 1:
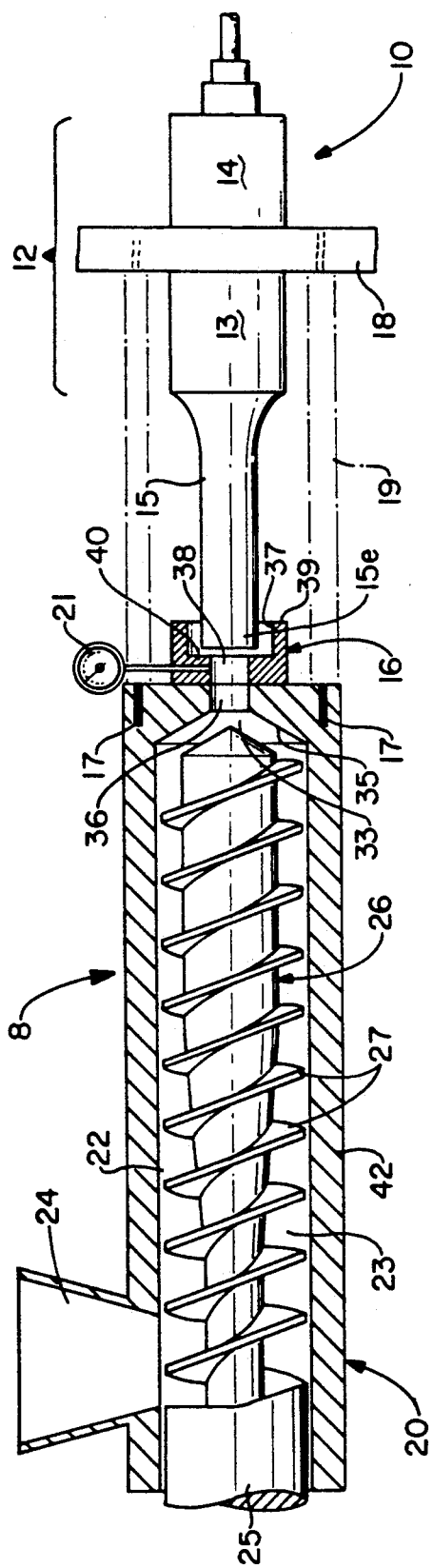
FIG. 1 is an elevational view, in cross-section of the ultrasonic reactor along its longitudinal axis.

| Detailed Component Part List | |
|---|---|
| Part Number | Description |
| 10 | ultrasonic generator |
| 12 | transducer |
| 13 | booster |
| 14 | converter |
| 15 | horn |
| 16 | die |
| 17 | mounting holes |
| 18 | mounting bracket |
| 19 | adapter legs |
| 20 | reactor |
| 21 | pressure gauge |
| 22 | barrel |
| 24 | hopper |

| -continued | |
|---|---|
| Detailed Component Part List | |
| Part Number | Description |
| 25 | drive |
| 26 | reactor screw |
| 27 | spiral ridges on shaft |
| 28 | motor (not shown) |
| 36 | reactor exit bore |
| 37 | die exit bore |
| 38 | die inlet bore |
| 39 | termination point of die |
| 42 | heating jacket |
| 44 | longitudinal die/horn combination |
| 46 | radial die/horn combination |
| 48 | oblique die/horn combination |
| 50 | internal die/horn combination |
| 52 | gasket |
| 54 | die void space |
| 56 | die heating and/or cooling coils |
| 58 | die wall |
| 60 | devulcanization zone entry |
| 62 | devulcanization zone exit |
| c | clearance between the exit point of the die inlet bore and the tip of the horn |
| $d_e$ | die exit bore diameter |
| $d_h$ | horn cross-section diameter |
| $d_i$ | die inlet bore diameter |
| $d_r$ | reactor exit bore diameter |
| h | height between ultrasonic horns |
| $l_b$ | die exit bore depth |
| $l_p$ | depth of insertion of ultrasonic horn section measured from the termination point of the die. |

DETAILED DISCLOSURE OF THE INVENTION

Referring now to the drawings wherein the showings are for purposes of illustrating the preferred embodiment of the invention only and not for purposes of limiting the same, the Figures show the effective application of ultrasound to the continuous devulcanization of rubbers.

It is well known that vulcanized elastomers having a three-dimensional chemical network, cannot flow under the effect of heat and/or pressure. It is precisely for this reason that to date, no literature has described the utilization of an extruder in order to further process a vulcanized rubber. This physical property has prohibited the application of extruder technology to the huge problem of recycling used tires and other vulcanized elastomeric products.

However, it has been discovered that through the application of certain levels of ultrasonic amplitudes in the presence of pressure, and optionally heat, the three-dimensional network of vulcanized elastomer can be broken down. As a most desirable consequence, ultrasonically treated cured rubber becomes soft, thereby enabling this material to be reprocessed and shaped in a manner similar to that employed with uncured elastomers.

FIG. 1 is a semi-schematic representation of a reactor (e.g. an extruder) or any device which can transport vulcanized rubber while simultaneously exerting pressure on it, generally 20, connected to an ultrasonic die assembly, generally 10, of the invention. As shown, the die assembly 10 consists of a transducer portion 12, which includes a power converter 14 and booster 13, connected to a horn portion 15, the assembly being supported by mounting bracket 18, and being attached to the reactor 20 through an adaptor portion 19. The reactor 20 includes a barrel 22, fed through hopper 24, the screw 26 within the barrel portion being driven by a drive 25, energized by a motor 28 (not shown). The horn portion 15 includes a die portion 16 through which the devulcanized elastomer being extruded is forced at a pressure shown by a pressure gauge 21.

Additionally shown in FIG. 1 is ultrasonic generator 10 of the ultrasonic die of the invention, movably attached by mounting bracket 18 through adaptor legs 19 to a reactor 20. As more clearly shown in FIG. 2, the horn portion 15 of the ultrasonic die is shown penetrating to a depth $l_p$ into the die 16 of exit bore depth $l_b$. The distance between $l_p$ and $l_b$ is critical for the effective operation of the devulcanization process and the difference between the value of $l_p$, the horn penetration depth, subtracted from $l_b$, the exit bore depth defines a clearance c through which rubber particles are extruded. If this clearance ($l_b - l_p$) is larger than the rubber particle size, some particles of vulcanized rubber will escape without being devulcanized. On the other hand, if the clearance is too small, the pressure generated in the reactor exit bore may increase and lead to an inability to initiate the ultrasonic generator. There exists some optimal clearance which is dependent upon the size of the rubber particles and/or the thickness of the rubber shreds, and the ultrasonic amplitude, within which optimal conditions of devulcanization can be achieved. In particular, optimal conditions of devulcanization can be achieved when the clearance is between 0.2–0.8 mm, but lower and larger clearances are envisioned.

Additionally, the horn cross-section diameter $d_h$ vis-a-vis the die inlet bore diameter $d_i$ is critical. If the horn cross-section diameter $d_h$ is less than the die inlet bore diameter $d_i$, then particles of vulcanized elastomer are allowed to pass through die exit bore diameter $d_e$ without any significant devulcanization. In a preferred mode, the relationship will be that the diameter of reactor exit bore $d_r$ will closely approximate the die inlet bore diameter $d_i$. Additionally, the ultrasonic horn diameter $d_h$ will be greater than die inlet bore $d_i$, but yet be less than die exit bore $d_e$.

The energy imparted by the ultrasonic waves in the presence of pressure and optionally heat, imposed on the vulcanized rubber are believed responsible for the fast devulcanization. Thus both wave frequency, as well as amplitude are important processing parameters.

Figure 3:
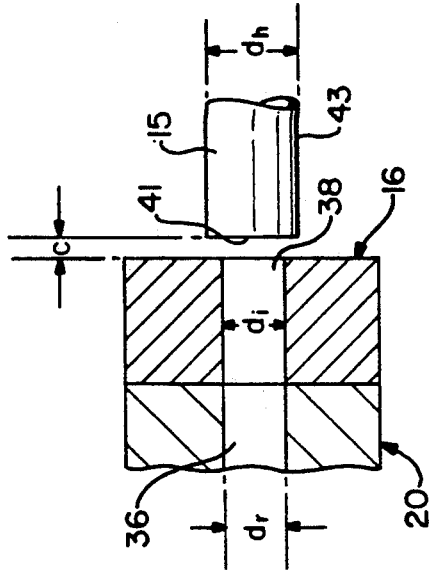
FIG. 3 is an exploded cross-sectional plan view of the die of an ultrasonic reactor along its longitudinal axis, the die in this embodiment having only a first die inlet bore.

While a die possessing two distinctly different bore diameters $d_e$ and $d_i$, has been described so far, the invention is not limited to such. Since the key parameter is the relationship between the horn diameter $d_h$ and the die inlet bore $d_i$, there is no need to have a second exit bore diameter $d_e$. FIG. 3 illustrates this embodiment of the invention.

Figure 4:
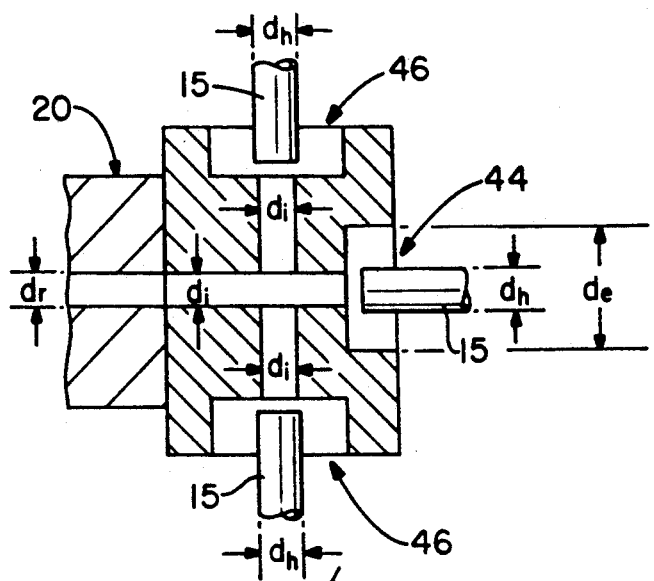
FIG. 4 is an exploded cross-sectional view of an alternative configuration of the die of an ultrasonic reactor along its longitudinal axis showing a longitudinal die/horn combination and a radial die/horn combination, each die having a first die inlet bore and a second die exit bore.
Figure 5:
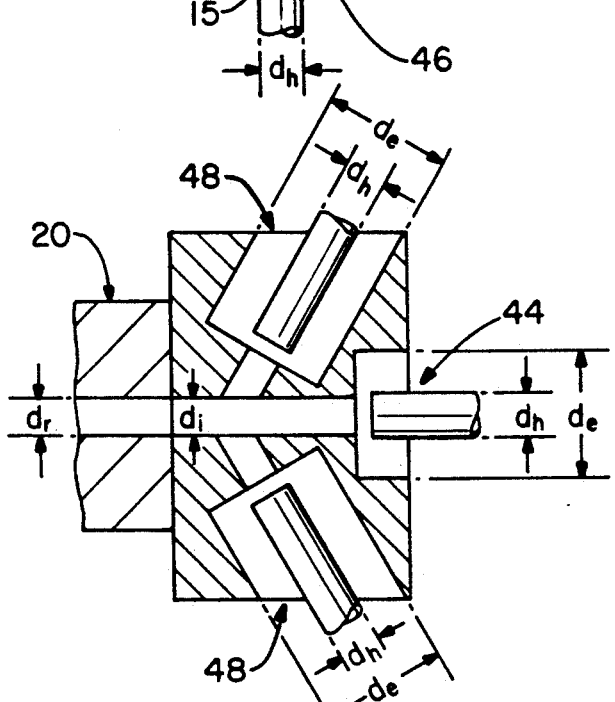
FIG. 5 is an exploded cross-sectional view of an alternative configuration of the die of an ultrasonic reactor along its longitudinal axis showing a longitudinal die/horn combination and an oblique die/horn combination, each die having a first die inlet bore and a second die exit bore.
Figure 6:
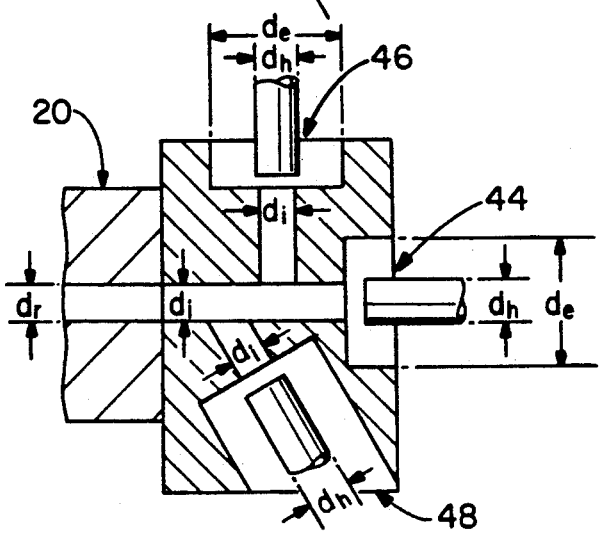
FIG. 6 is an exploded cross-sectional view of an alternative configuration of the die of an ultrasonic reactor along its longitudinal axis showing a longitudinal die/horn combination, a radial die/horn combination and an oblique die/horn combination, each die having a first die inlet bore and a second die exit bore.
Figure 7:
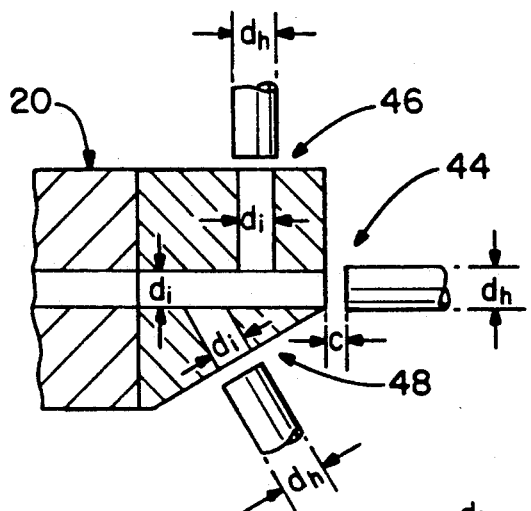
FIG. 7 is an exploded cross-sectional view of an alternative configuration of the die of an ultrasonic reactor along its longitudinal axis showing a longitudinal die/horn combination, a radial die/horn combination, and an oblique die/horn combination, each die only having a first die inlet bore.

While an ultrasonic reactor has been generally described so far containing mainly a single die with a single horn inserted therein, there is no reason to limit the invention to such. As shown in FIGS. 4–7, multiple combinations of die configurations, in so far as to both the positioning and the number of die/horn combinations are envisioned. The key parameter is that all of the horn/die combinations be co-axial to the longitudinal plane of the zone of devulcanization. With respect to the additional die/horn combinations which are positioned around a reactor exit bore, there is no limit on the upper number of these combinations other than that which is a natural ramification of available space considerations. As seen in FIG. 4, the reactor can be equipped with longitudinal die/horn combinations 44 and radial die/horn combinations 46. FIG. 5 illustrates the ability to incorporate longitudinal die/horn combinations 44 with oblique die/horn combinations 48. And FIG. 6 shows a die configuration wherein a longitudinal die/horn combinations 44 is positioned in concert with a radial die/horn combination 46 and an oblique die/horn combination 48. FIG. 7 illustrates the ability to perform the invention with a die possessing only a die inlet bore $d_i$.

Figure 2:
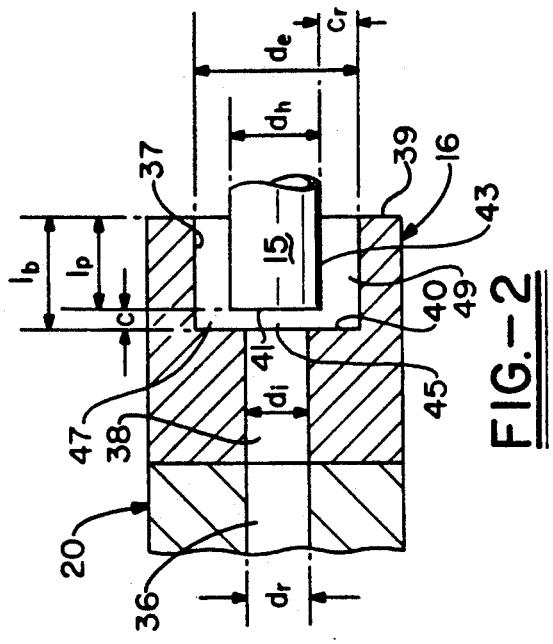
FIG. 2 is an exploded cross-sectional plan view of the die of an ultrasonic reactor along its longitudinal axis, the die in this embodiment having a first die inlet bore and a second die exit bore.

In a similar manner to the relationship between the dies shown in FIGS. 2 and 3, when multiple dies are utilized, such as in FIGS. 4–7, there is also no necessity for the dies to have dies possessing two different bore diameters. As with the single die configuration, since the key parameter is the relationship between the horn diameter $d_h$ and the die inlet bore $d_i$, there is no need to have a second exit bore diameter $d_e$. FIG. 7 illustrates this embodiment of the invention.

Figure 8:
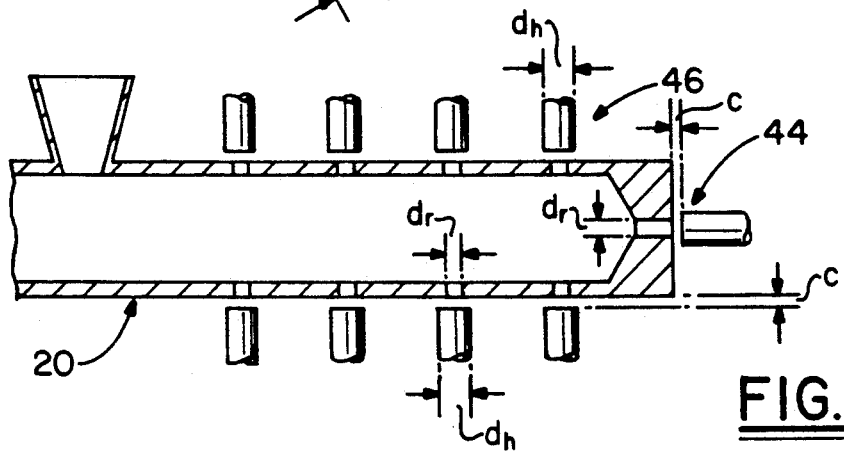
FIG. 8 is a cross-sectional view of an alternative embodiment of the ultrasonic reactor along its longitudinal axis showing a plurality of radial die/horn combinations about the circumference of the reactor with a longitudinal die/horn combination, the reactor not being fitted with any die.

In another embodiment of the invention, and since the diameter of the reactor exit bore $d_r$ closely matches the die inlet bore diameter $d_i$, in some instances, for reactors which have been specifically designed for this purpose, there is no need for a die attached to an exit bore. This arrangement is shown in FIG. 8. In this arrangement, a plurality of radial die/horn combinations 46 are situated at the periphery of the circumference of the longitudinal axis of reactor 20. As with the previous arrangements, the clearance between the periphery of the reactor exit bore and the tip of the ultrasonic horn is positioned at a distance which is maximized by experiment. Typically this clearance is between 0.2 mm–0.8 mm, although both larger and smaller clearances are envisioned under appropriate conditions. Unlike previous embodiments described, there is no absolute need to position a die/horn combination at the reactor exit bore, and in this embodiment, the longitudinal die/horn combination is optional.

Considerable latitude is permissible in selecting the wave frequency and amplitude, and as suggested in the preceding, optimum conditions for a particular polymer are best determined by experimental trials conducted on the rubber of interest. Within such considerations, however, it has been found that the frequency of the waves should be in the ultrasonic region, i.e., at least 15 kilohertz, and a range of from about 15 kHz to 50 kHz is preferable. The amplitude of the wave can be varied up to an amplitude of at least about 10 microns to about 200 microns, again, the exact amplitude and frequency best suited for a particular application being readily determined by experimentation.

The exact location of the point of attachment of the mounting bracket 18 and the length of adaptor legs 19 in relation to the horn 15 is important. It has been determined that depth to which the tip of the horn 15 is inserted into the die exit bore $d_e$ is determined by the devulcanization characteristics of the compound, and particularly on its ability to dissipate ultrasonic energy. In a preferred embodiment, the distance separating the tip of the ultrasonic horn 15 and the terminal point of the die inlet bore $d_i$ is about 0.2–0.8 mm, but larger and smaller clearances are possible.

The reactor is surrounded by a heating jacket 42 which may depend upon electrical heating elements, or heat transfer media of the type well known in the art. The purpose of the jacket is to lower the pressure within the reactor generated by the vulcanized elastomeric particles which are pushed to the reactor exit bore $d_r$. In an unheated mode, the reactor pressure at the extruder exit bore $d_r$ becomes inordinately high leading to overload of the ultrasonic wave generator.

Figure 14:
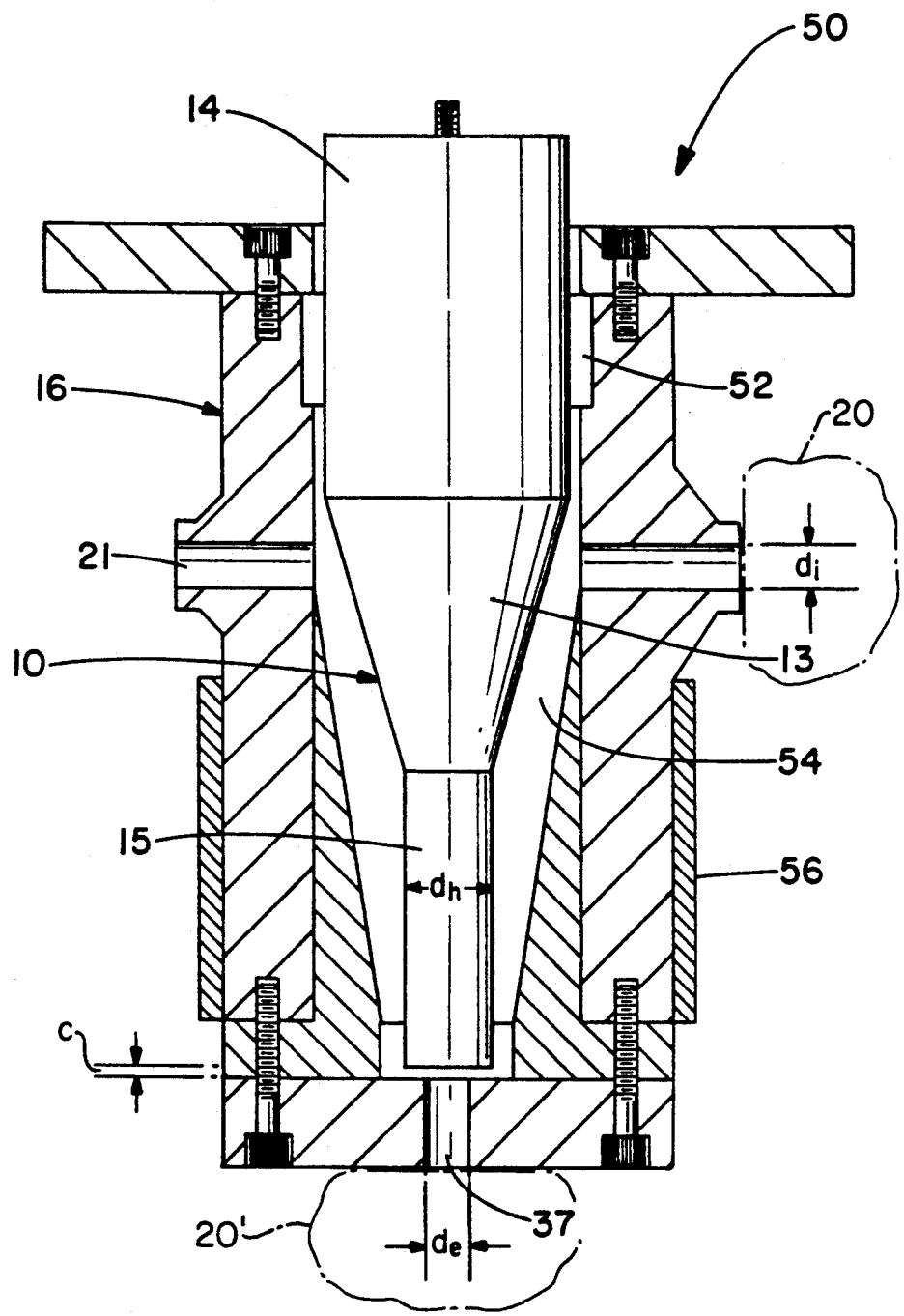
FIG. 14 is an elevational view in vertical cross-section or a top plan view in horizontal cross-section, both being applicable to the apparatus illustrated, of an internal ultrasonic horn contained within an ultrasonic die attachment wherein the entry and exit bores may be interchangeable as desired.

In an alternative embodiment, the most preferred embodiment known to the inventors to date and shown in FIG. 14, the ultrasonic horn/die combination 50, illustrates that, unlike the configuration shown initially in FIG. 1, the ultrasonic horn 10 is positioned internally in die 16. Vulcanized material is fed into die 16 through reactor bore exit 36 of exit bore diameter $d_r$ and into die inlet bore 38 of diameter $d_i$. Positioned transverse to the longitudinal axis of reactor 20 is ultrasonic generator 10 containing transducer 12 with components converter 14 and booster 13, and horn 15. The vulcanized material is moved under pressure through internal die void space 54 toward die exit bore 37 due to the forward pressure generated by reactor screw 26 within reactor 20. Movement of the vulcanized material is precluded from migration toward the converter end 14 of ultrasonic generator 10 by the presence of gasket 52 which sealingly prohibits the flow of material. The gasket material can be of any composition which effects a pressure-tight seal, and often is made of teflon. The die pressure is measured via pressure gauge 21. The die is optionally heated and/or cooled, depending upon the material to be devulcanized or material to be decrosslinked. While the positioning of the ultrasonic horn is shown transverse to the longitudinal axis of the reactor, it is equally possible to position the ultrasonic horn at oblique angles to the longitudinal axis of the reactor.

As the vulcanized material approaches the tip of horn 15, the material flows into the path of the ultrasonic waves generated by the horn due to the diameter of the horn $d_h$ being larger than that of die exit bore $d_e$. The internal arrangement of the horn within the die allows the devulcanization to proceed in an environment which is not exposed to atmospheric oxygen, thereby minimizing the amount of product degradation which might otherwise occur with for example, the arrangement shown in FIG. 1.

As discussed previously in association with FIG. 1, the clearance, c, preferred between the tip of horn 15 and the beginning of die exit bore 37 is between 0.2-0.8 mm, but larger and smaller clearances are envisioned. The clearance necessary being a function of the speed of the reactor screw, with associated generated pressure. Additionally, the horn cross-sectional diameter $d_h$ will preferably be greater than die exit bore $d_e$. In this configuration, particles of the vulcanized elastomer would be required to pass through die exit bore under sufficient pressure and in the ultrasonic wave path to insure devulcanization.

While a preferred embodiment has be described in regard to FIG. 14, it is envisioned that when the ultrasonic horn is internal of the die, the designations of die inlet and die exit bores can be interchanged and that it is equally possible to operate the devulcanization reaction when the vulcanized material is fed from reactor 20' (analogous to reactor 20) through die exit bore 37 and leaves through die inlet bore 38 of FIG. 14.

Figure 18:
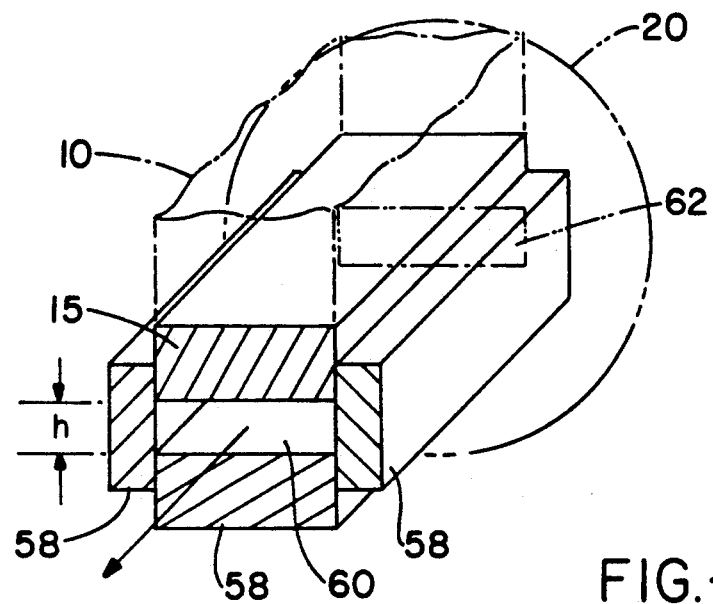
FIG. 18 is an exploded perspective view, in cross-section of an alternative design, illustrating a non-rounded ultrasonic horn/die configuration wherein one ultrasonic horn is positioned between walls of a die in parallel planes to the longitudinal axis of the reactor.

In FIG. 18, an alternative embodiment of the ultrasonic horn/die is shown wherein one non-circular ultrasonic horn 10 is positioned along parallel planes to the longitudinal axis of the reactor 20. The ultrasonic horn is separated by a height, h from its opposed die wall. In order to effect the devulcanization and/or decrosslinking reaction, it will be seen, from the previous discussions, that similar constraints to that imposed on the definition of the clearance, c, are correspondingly applicable to the height, h. In general, the value of the height will be essentially that previously defined for c, thereby permitting material to be processed through the parallel-spaced ultrasonic horn by the ingress through devulcanization zone entrance and egress through the devulcanization zone exit.

Figure 19:
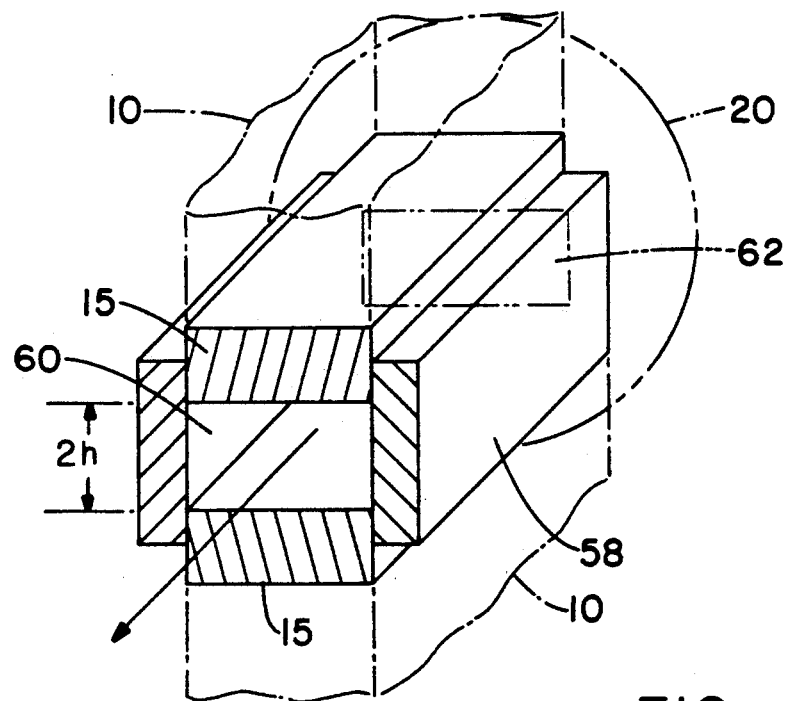
FIG. 19 is an exploded perspective view, in cross-section of an alternative design, illustrating a non-rounded ultrasonic horn/die configuration wherein two ultrasonic horns are positioned between walls of a die in parallel planes to the longitudinal axis of the reactor.

In FIG. 19, an alternative embodiment of the ultrasonic horn/die is shown wherein two non-circular ultranonic horns 10 is positioned along parallel planes to the longitudinal axis of the reactor 20. The ultrasonic horns are separated by a height, h from their opposed surfaces. In order to effect the devulcanization and/or decrosslinking reaction, it will be seen, from the previous discussions, that similar constraints to that imposed on the definition of the clearance, c, are correspondingly applicable to the height, h. In general, the value of the height will be essentially, twice the value for the clearance, thereby permitting additional material to be processed through the parallel-spaced ultrasonic horns by the ingress through devulcanization zone entrance and egress through the devulcanization zone exit.

EXAMPLES

Samples of hydrogenated nitrile rubber (HNBR) containing 50 parts of carbon black, 25 parts clay, and various other additives (e.g. accelerator, antioxidant, and curatives known to those skilled in the art), and fluorocarbon polymer (FCP) containing 30 parts silica and various other additives known to those skilled in the art, were vulcanized by using a compression molding technique. The compositions were compression molded and vulcanized into slabs. Specifically, the following conditions were employed.

| | |
|---|---|
| HNBR | 350° F. for 5 minutes at 250 PSIG. |
| FCP | 350° F. for 5 minutes at 250 PSIG, followed by 450° F. for 10 hours in an oven. |

The vulcanized slabs were subsequently cut into pieces or strands of nominal size approximately (15 mm×5 mm×3 mm) and pieces placed in the hopper of a one inch single screw extruder for thermoplastics operating at various rotation speeds detailed in the following examples and extruded through a 0.5 mm die clearance under pressure, with an ultrasonic horn of 12.7 mm diameter operating at 20 kHz and various wave amplitudes. While the following examples used primarily pieces of vulcanized rubber, the use of longer or shorter strands and/or particles is envisioned.

After passing the vulcanized elastomers through the heated extruder operating at 200° C. and 175° C. for HNBR and FCP, respectively, the devulcanized elastomers were collected and analyzed. In order to perform the analysis, a sample was prepared from the collected material by compression molding at room temperature for 10 minutes at approximately 250 psig. The viscosity characteristics of the devulcanized compounds were measured.

The viscosity vs. shear rate measurements were made at 71° C. using a modified multi-speed Mooney rheometer (Monsanto).

EXAMPLE 1

A series of devulcanization runs were performed on hydrogenated nitrile rubber compound. Pieces of this material were fed into the extruder operating at a barrel temperature of 200° C. and a die clearance of 0.5 mm and an ultrasonic wave amplitude of 96 μm at 20 kHz. The extruder screw was operated at speeds of (1) 5 rpm; (2) 15 rpm; and (3) 25 rpm. Pressure generated by the extruder were 600, 1,200, and 1,800 psi respectively. For comparative purposes, an uncured hydrogenated nitrile rubber compound (4) was tested. The results are graphed in FIG. 9 as a series of plots on a graph of the log of the viscosity ($\eta$) vs. the log of the shear rate ($\gamma$).

Figure 9:
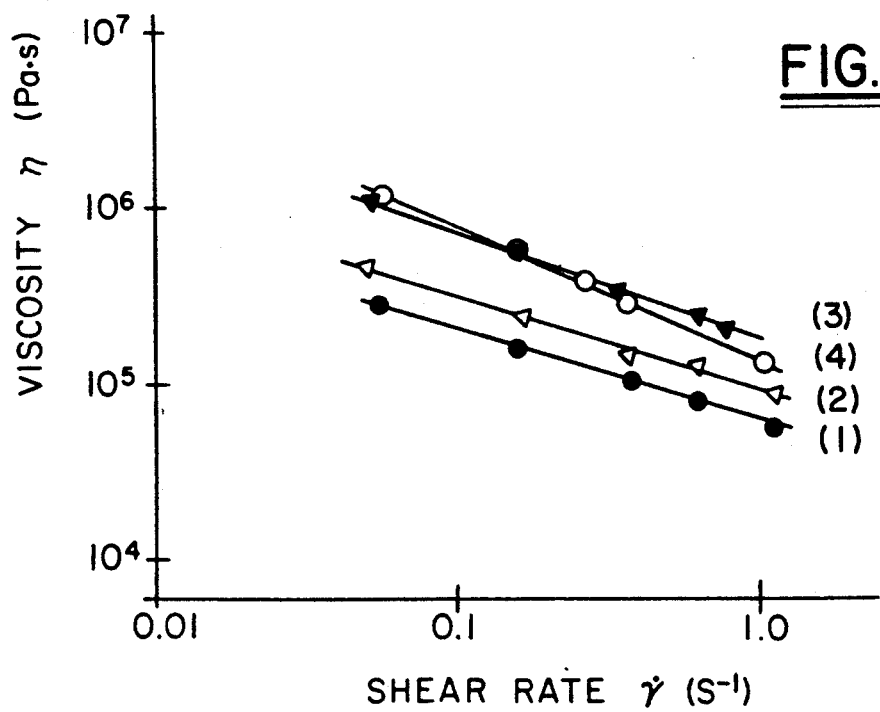
FIG. 9 is a graph of viscosity vs. shear rate for vulcanized hydrogenated nitrile rubber pushed through the extruder and devulcanized at various speeds and pressures at a barrel temperature of 200° C. and a clearance ($c = l_b - l_p$) of 0.5 mm as measured at 71° C. and an ultrasonic wave amplitude of 96 $\mu$m: (1) 5 rpm (600 psi); (2) 15 rpm (1,200 psi); (3) 25 rpm (1,800 psi); and (4) uncured (unvulcanized) hydrogenated nitrile rubber.

As is seen in FIG. 9, reference compound (4) illustrates a base comparative case of the original unvulcanized material. Evident in viewing the curves for compounds (1), (2), and (3), the application of ultrasonic waves of amplitude 96 μm has totally devulcanized the materials. Additionally seen from the figure is the fact that the lower the screw rotation speed, the greater the degree of carbon-carbon bond breaking. This is shown in the lowered position of the curves in relation to the base comparative case (4). The application of ultrasonics has not only devulcanized the material, but also lowered the molecular weight of the elastomer, indicating the breaking of carbon-carbon bonds within the polymeric chain.

The lower the rotation speed of the screw, which translates to a longer residence time of the elastomer in the ultrasonic field, the greater the degree of depolymerization.

EXAMPLE 2

Figure 10:
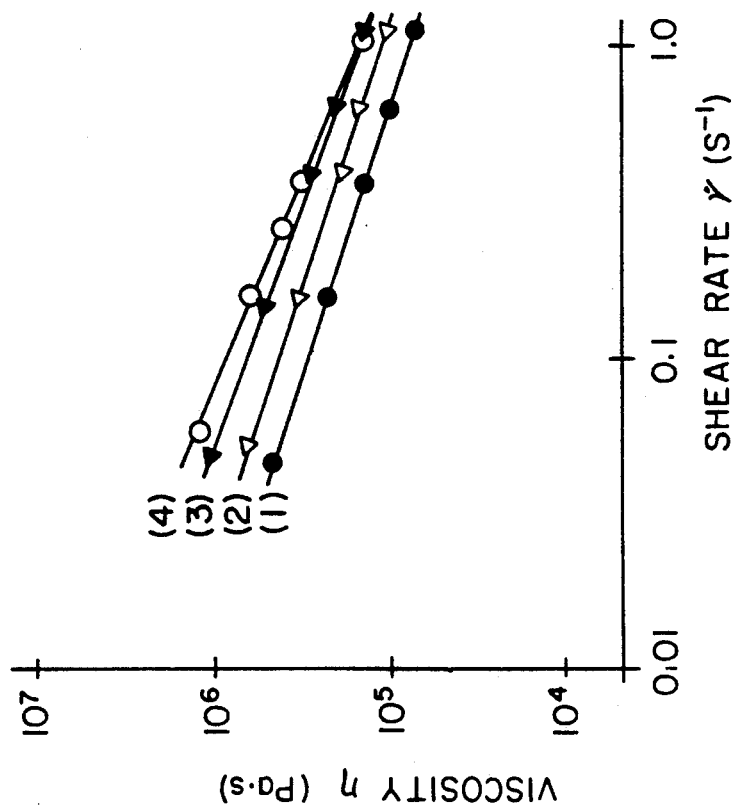
FIG. 10 is a graph of viscosity vs. shear rate for vulcanized hydrogenated nitrile rubber pushed through the extruder and devulcanized at various speeds and pressures at a barrel temperature of 200° C. and a clearance ($c = l_b - l_p$) of 0.5 mm as measured at 71° C. and an ultrasonic wave amplitude of 82 $\mu$m: (1) 5 rpm (600 psi); (2) 10 rpm (700 psi); (3) 15 rpm (1,050 psi); and (4) uncured (unvulcanized) hydrogenated nitrile rubber.

To test the effect of the ultrasonic wave amplitude, a series of runs were made at a lowered amplitude of 82 μm for screw speeds of (1) 5 rpm (600 psi); (2) 10 rpm (700 psi); and (3) 15 rpm (1,050 psi). The samples were prepared in a manner analogous to Example 1. As shown in FIG. 10, a similar set of data was obtained indicating the effectiveness of the ultrasonic treatment at a lowered amplitude.

EXAMPLE 3

Figure 11:
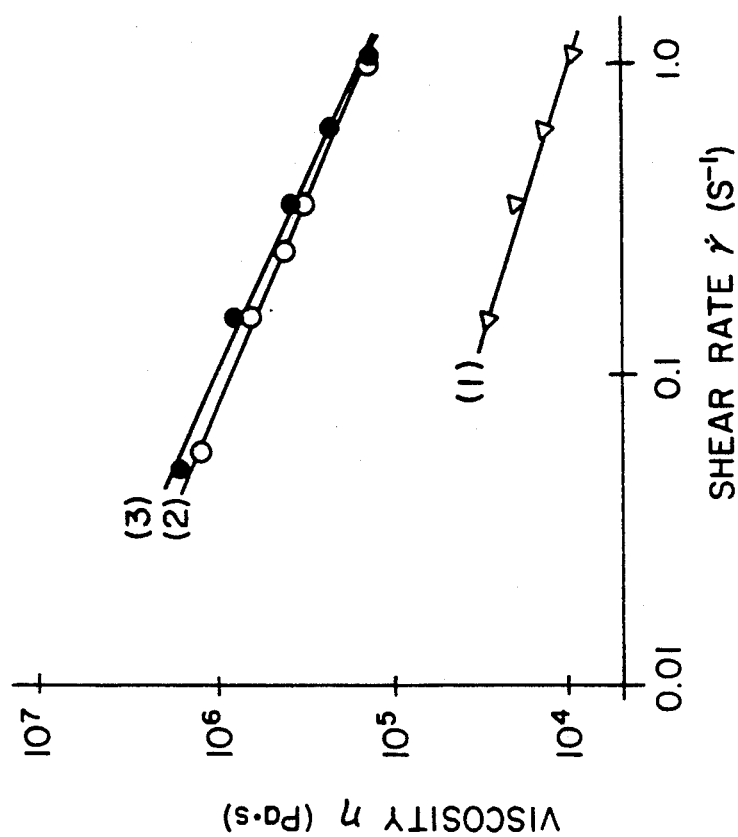
FIG. 11 is a graph of viscosity vs. shear rate for vulcanized hydrogenated nitrile rubber pushed through the extruder and devulcanized at various speeds and pressures at a barrel temperature of 200° C. and a clearance ($c = l_b - l_p$) of 0.5 mm as measured at 71° C. and an ultrasonic wave amplitude of 37 $\mu$m: (1) 1 rpm (550 psi); (2) 5 rpm (1,200 psi); and (3) uncured (unvulcanized) hydrogenated nitrile rubber.

The ultrasonic wave amplitude was decreased further to 37 μm in a series of runs plotted in FIG. 11 for screw speeds of (1) 1 rpm (550 psi); and (2) 5 rpm (1,200 psi); and generated in a manner similar to that employed with Example 1. As illustrated in the graph, the data clearly indicates that lower wave amplitudes, coupled with longer residence times cooperatively interact to facilitate not only devulcanization, but to also significantly depolymerize the elastomer as shown at a revolution speed of 1 rpm.

EXAMPLE 4

Figure 12:
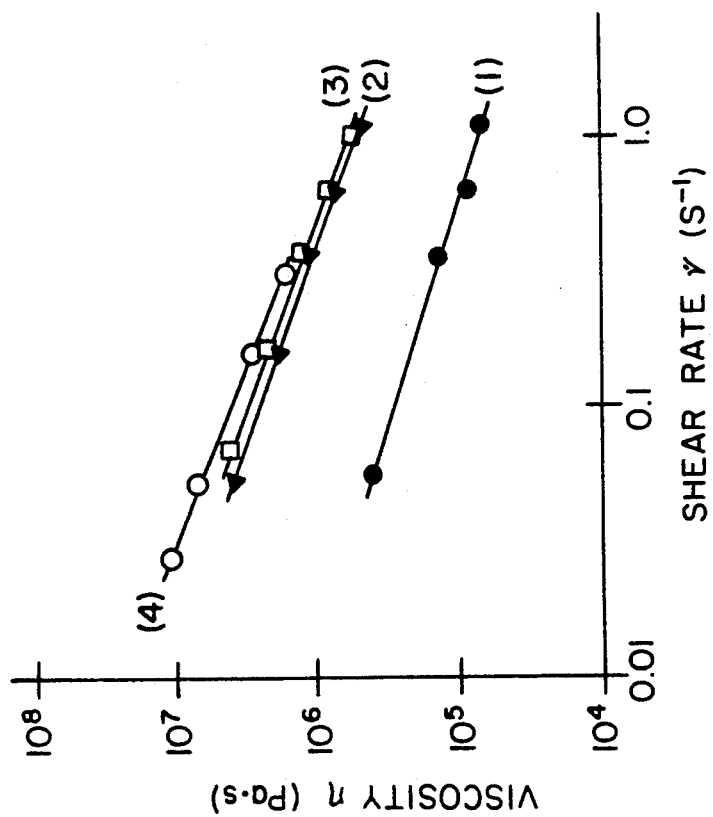
FIG. 12 is a graph of viscosity vs. shear rate for a vulcanized fluoroelastomer pushed through the extruder and devulcanized at various speeds and pressures at a barrel temperature of 175° C. and a clearance ($c = l_b - l_p$) of 0.5 mn as measured at 71° C. and an ultrasonic wave amplitude of 96 $\mu$m: (1) 2 rpm (550 psi); (2) 4 rpm (600 psi); (3) 6 rpm (700 psi); and (4) uncured (unvulcanized) fluoroelastomer.

A series of devulcanization runs were performed on fluorocarbon elastomer compound. Pieces of this material were fed into the extruder operating at a barrel temperature of 175° C. and a die clearance of 0.5 mm and an ultrasonic wave amplitude of 96 μm at 20 kHz. The extruder screw was operated at speeds of (1) 2 rpm; (2) 4 rpm; and (3) 6 rpm. Pressures generated by the extruder were 550, 600, and 700 psi respectively. For comparative purposes, an uncured fluorocarbon elastomer compound (4) was tested. The results are graphed in FIG. 12 as a series of plots on a graph of the log of the viscosity ($\eta$) vs. the log of the shear rate ($\gamma$).

As is seen in the Figure, reference compound (4) illustrates a base comparative case when the material is unvulcanized. Evident in viewing the curves for compounds (1), (2), and (3), the application of ultrasonic waves of amplitude 96 μm has once again, totally devulcanized the materials. Additionally seen from the figure is the fact that the lower the screw rotation speed, the greater the degree of carbon-carbon bond breaking. This is shown in the lowered position of the curve observed for a screw speed of 2 rpm in relation to the base comparative case (4). The application of ultrasonics has not only devulcanized the material, but also lowered the molecular weight of the elastomer, indicating the breaking of carbon-carbon bonds within the polymeric chain.

The lower the rotation speed of the screw, which translates to a longer residence time of the elastomer in the ultrasonic field, the greater the degree of depolymerization.

EXAMPLE 5

Figure 13:
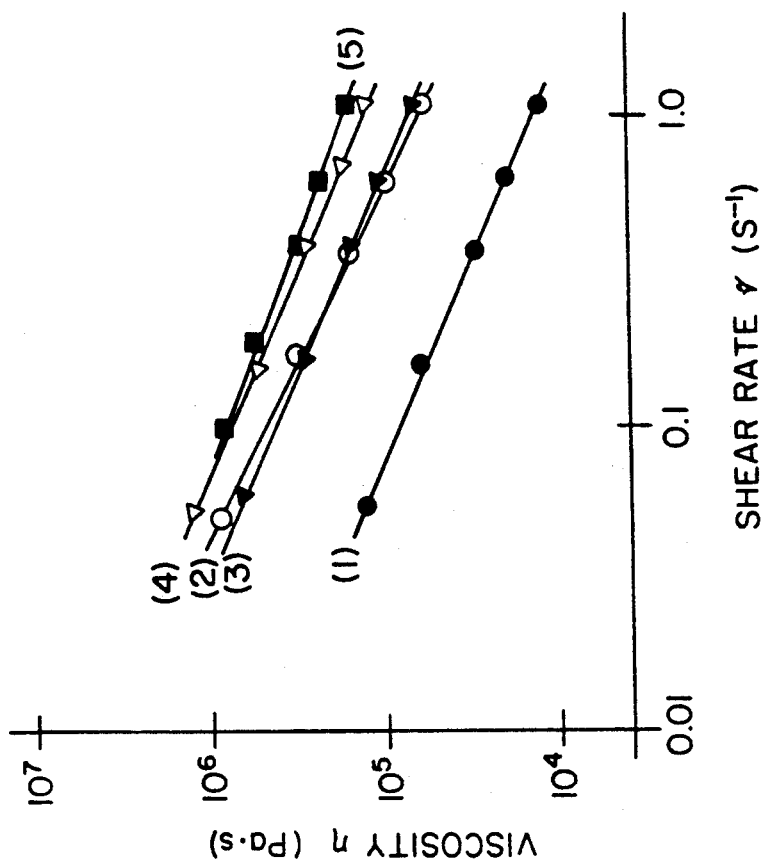
FIG. 13 is a graph of viscosity vs. shear rate for vulcanized SBR/NR-based (styrene butadiene rubber/natural rubber) truck or passenger tire tread peel pushed through the extruder and devulcanized at various speeds, pressures and ultrasonic amplitudes at a barrel temperature of 100° C. and a clearance $(c = l_b - l_p)$ of 0.5 mm as measured at 71° C.: (1) 2 rpm (350 psi), 82 μm; (3) 5 rpm (400 psi), 96 μm; (4) 5 rpm (600 psi), 82 μm; and (5) 8 rpm (500 psi), 96 μm.

To test the effectiveness of the technique on a passenger car tire tread compound, a sample of vulcanized rubber based on styrene-butadiene rubber/natural rubber compound was obtained from Rondy Inc., Akron, Ohio. The particle size of the material was nominally 0.1–0.05". Pieces of this vulcanized material were fed into the extruder operating at a barrel temperature of 100° C. and a die clearance of 0.5 mm and ultrasonic wave amplitudes of 96 μm and 82 μm at 20 kHz. The extruder screw was operated at various speeds of 2 rpm, 5 rpm, and 8 rpm at various pressures. As is evidenced by the fact that these materials exhibit flow curves at all (FIG. 13), is strong evidence that devulcanization has occurred since the original vulcanized SBR/NR-based material does not flow at all. Based upon the previous figures, it is anticipated that some amount of carbon-carbon bond breaking has also occurred.

EXAMPLE 6

A sample of styrene-butadiene rubber (SBR) containing curatives, was vulcanized at 170° C. for 12 min. in a compression molding press at about 250 psig and quenched in a mold having internal dimensions of 20×20×0.3 cm³. Prepared plates were cut into pieces which were fed into a single screw extruder with an external (FIG. 1) and internal (FIG. 14) ultrasonic horn/die configuration. The reactor barrel temperature was 120° C. with a screw rotation speed of 30 rpm. The die clearance was 0.5 mm and ultrasonic waves of 80 μm at 20 kHz. An ultrasonic horn diameter of 12.7 mm was used and the inlet diameter into the zone of devulcanization was 19 mm. The outer diameter for the extrudate was 6.35 mm. During passage through the clearance, the vulcanized SBR was devulcanized, collected and analyzed.

Figure 15:
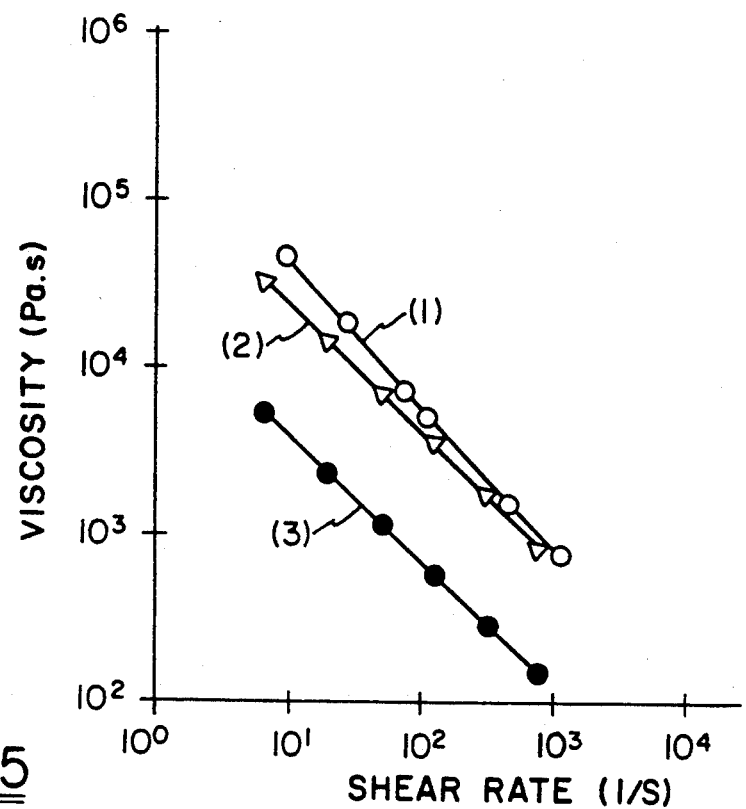
FIG. 15 is a graph of viscosity vs. shear rate for original unvulcanized SBR (styrene butadiene) rubber (1); SBR rubber which was vulcanized and subsequently pushed through the extruder and devulcanized using both the external ultrasonic die configuration of FIG. 1 (3); and the internal ultrasonic die configuration of FIG. 14 (2), at a barrel temperature of 120° C., a clearance $(c = l_b - l_p)$ of 0.5 mm as measured at 71° C., a screw rotation speed of 30 rpm, and an ultrasonic wave amplitude of 80 μm at 20 kHz.

The viscosity of the devulcanized SBR rubber obtained by using the external and internal dies, as well as the viscosity of the original unvulcanized SBR rubber were measured using a modified multi-speed Mooney rheometer (Monsanto). The results are shown in FIG. 15 as a series of plots of the log of the viscosity vs. the log of the shear rate. As shown in the Figure, the viscosity of devulcanized SBR rubber obtained with the internal die arrangement is higher than that obtained with the external arrangement. This indicates that there is less degradation taking place simultaneously with the devulcanization reaction.

Figure 16:
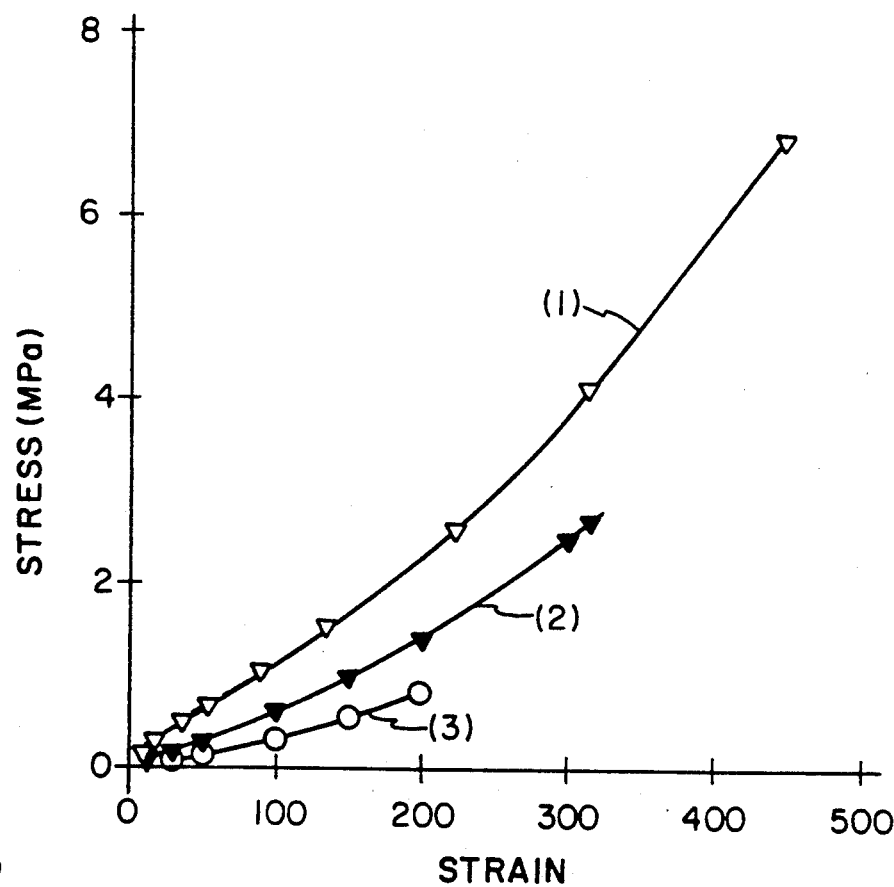
FIG. 16 is a graph of stress-strain curves for original unvulcanized SBR (styrene butadiene) rubber (1); SBR rubber which was vulcanized and subsequently pushed through the extruder and devulcanized using both the external ultrasonic die configuration of FIG. 1 (3); and the internal ultrasonic die configuration of FIG. 14 (2), at a barrel temperature of 120° C., a clearance $(c = l_b - l_p)$ of 0.5 mm as measured at 71° C., a screw rotation speed of 20 rpm, and an wave amplitude of 80 μm at 20 kHz.

The devulcanized SBR rubber was subsequently mixed with curatives and vulcanized again in a compression molding press at the same conditions as in the first vulcanization. Rubber plates were prepared which were subsequently cut into strips for the stress-strain measurements. These measurements were performed using a Monsanto Tensiometer. FIG. 16 shows the stress-strain curves for the original vulcanized SBR rubber and revulcanized SBR rubber which was devulcanized previously in both the external and internal horn/die configuration. It is clearly seen that the SBR rubber devulcanized in the internal horn/die arrangement, and then subsequently revulcanized, has the better stress-strain characteristics than the SBR rubber which had been devulcanized in the external horn/die arrangement, and then subsequently revulcanized.

EXAMPLE 7

Figure 17:
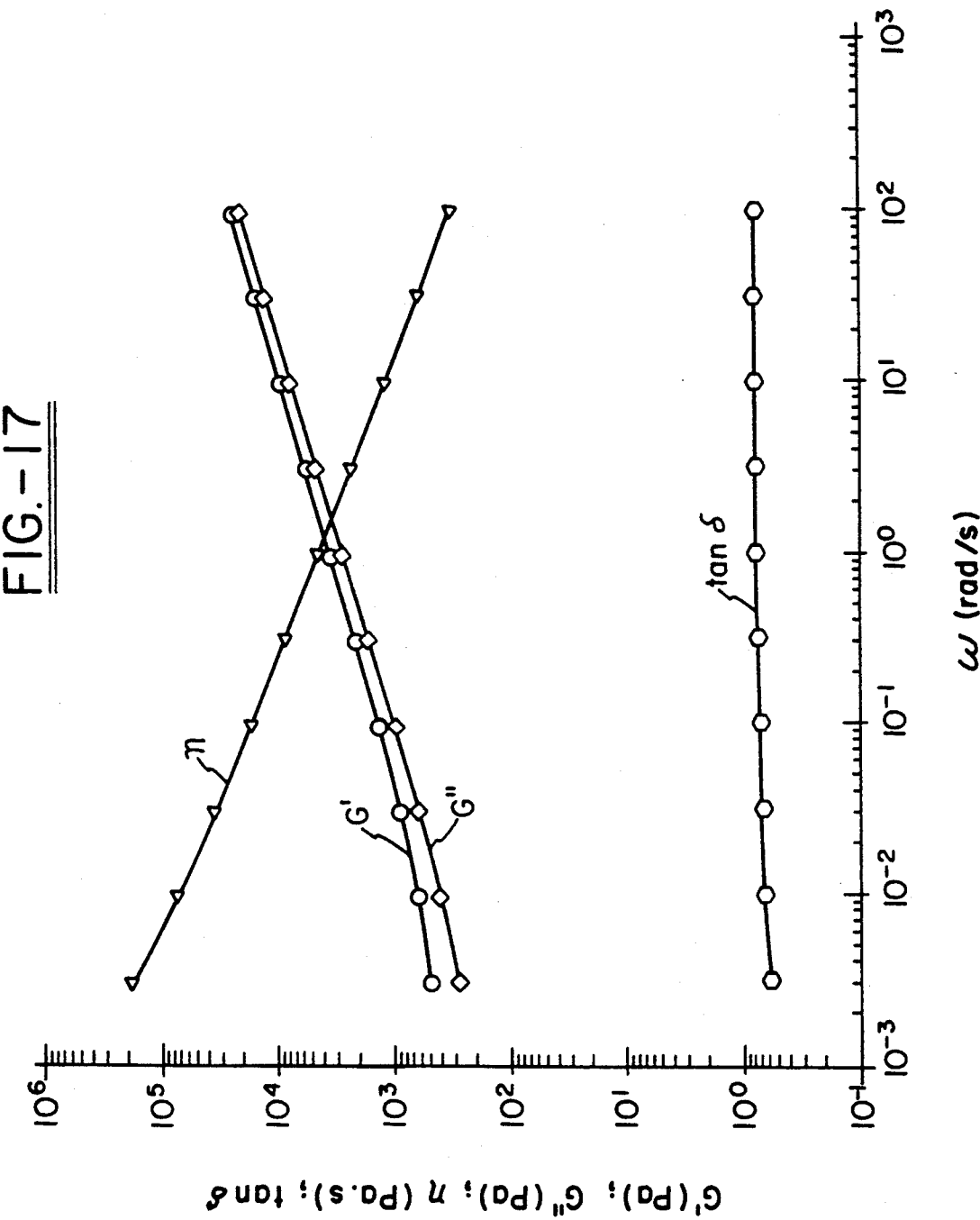
FIG. 17 is a graph of storage modulus (G'), loss modulus (G''), absolute value of dynamic viscosity ($\eta^*$), and tan δ of decrosslinked ethylene vinyl acetate foam sheets using the internal ultrasonic die configuration of FIG. 14 at a barrel temperature of 200° C., a clearance $(c = l_b - l_p)$ of 0.625 mm, a screw rotation speed of 2 rpm, and an ultrasonic wave amplitude of 105 μm at 20 kHz.

Crosslinked ethylene vinyl acetate foam sheets (Evalite 3S), supplied by Monarch Rubber Company were cut into strands and fed into a single screw extruder with ultrasonic die attachment. A barrel and die temperature were maintained at 200° C. A screw rotation of 2 rpm was used with a die clearance of 0.625 mm and ultrasonic wave amplitude of 105 μm at 20 kHz. an ultrasonic horn of 12.7 mm diameter was used. The inlet diameter into the zone of decrosslinking was 19 mm and the outlet diameter for the extrudate was 6.35 mm. The collected decrosslinked material was a solid at room temperature. This decrosslinked material was compression molded into sheets of dimensions $15 \times 10 \times 0.2$ cm$^3$ at a temperature of 175° C., using a preheating time of 5 min. and a holding time of 5 min. at 4,500 psig. The ability of the decrosslinked material to be molded is a strong indication that the material can flow. From these sheets, disks of 2 cm diameter were punched for rheological studies by means of a Rheometrix Mechanical Spectrometer. Various frequencies and constant amplitude (3%) were used at a temperature of 125° C. As shown in FIG. 17, the decrosslinked material showed rheological behavior typical of flowable thermoplastics as indicated by the storage modulus (G'), loss modulus (G''), absolute value of dynamic viscosity ($\eta^*$), and tan $\delta$ of the decrosslinked material.

DISCUSSION

As is evident from FIGS. 9–13, and 15–17, the devulcanization of rubbers and decrosslinking of crosslinked polymers, occurs rapidly, and quantitatively. In all instances, comparisons of the curve generated for unvulcanized material, with that generated from material which had been processed (devulcanized), indicated that the processed material curves never exceeded the unvulcanized standard. The occurrences of the lowered positioning of the curves in the Figures in relation to the unvalcanized standard, is due to the possibility of additionally breaking carbon-carbon bonds in the polymer if desired. The amount of carbon-carbon bond breakage is a controllable parameter and is dependent upon the factors of pressure and most particularly, on the residence time that the material spends in the zone of devulcanization. Devulcanization occurs very fast, typically within 0.1–10 seconds.

The type of rubber which is devulcanized can be of the polar or non-polar type. Without being limited to any enumerated list, some representative types of polar rubbers which are contemplated within the scope of this invention are chloroprene and nitrile rubbers. Again without being limited to any enumerated list, some representative types of non-polar rubbers which are contemplated within the scope of this invention are styrene-butadiene rubbers (SBR), natural rubber, ethylene-propylene rubbers, butadiene rubbers, isoprene rubbers, butyl rubbers, silicone rubbers and fluorocarbon rubbers.

While the initial focus of the discussion has been directed to the continuous devulcanization of rubbers, the invention is not limited to such. It is within the scope of this invention to include the application of ultrasonic waves to the breaking of 3-dimensional crosslinked polymeric networks in thermosets. Without being limited to the enumerated examples, a few representative systems would include polyurethanes, epoxy/phenolic resins, epoxy resins, saturated polyester resins, unsaturated polyester resins, phenolic/formaldehyde resins, etc.

While the figures and ensuing discussion have focused in particular on the application of an extruder to move the original vulcanized material to the extruder exit bore, there is no reason to limit the invention to such. In fact, the only requirements essential for the extruder section of the reactor is that it be capable of moving material under pressure toward the reactor outlet bore and into a receiving die inlet bore. Optionally, the reactor should be capable of being heated. The heating of the reactor tends to decrease the internal pressure generated at the exit bore of the reactor, and reduction of power consumption of the motor.

In its simplest mode of operation, the reactor is fitted at its exit bore with a die having one inlet bore and one exit bore. However, there is no reason to limit the invention to such. It is contemplated and within the scope of the invention to utilize multiple die inlet and exit bores originating off a common die receiving bore. When used in this fashion, it becomes possible to increase the throughput (amount of devulcanized material collected in a unit of time) significantly. One of the simplest methods of accomplishing this is to include additional exit bores positioned radially around the die. However, it is contemplated within the scope of the invention that other positioned dies and horns are possible. The key element is the alignment of the longitudinal axis of the ultrasonic horn with the axis of the exit bore of the reactor and/or inlet bore of the die.

While in describing the term die in this application, the term has been used to denote a separate component of the apparatus, there is no need to specifically limit the concept as such. In fact, it is quite possible that a device could be constructed which incorporates a die into the physical unit itself, without the need for any separate component. However, for ease of cleaning and routine maintenance, it is anticipated that the die would typically be a separate unit attached to the exit bore of the reactor.

It is also possible and within the scope of the invention to omit the die portion attached to the extruder. When in this configuration, the key parameter is that the diameter of the horn be larger than that of the exit bore of the reactor. The die arrangement is typically used for convenience in adapting existing equipment (i.e. extruders) to this application.

While the configuration of the die and/or reactor exit bore has been generally referred to as cylindrical or spherical in shape, there is no reason to limit the invention to such. It is possible to use other geometrically shaped dies and/or reactor exit bore shapes with the invention. Without being limited, it is contemplated that other geometrical shapes, such as rectangular slits, oval slits, etc., can be effectively used in the application. It is also within the scope of the invention that the die and/or reactor exit bore be of constant dimensions, or varying dimensions. The initial dimensions of a rectangular slit, for example may in effect be larger at the inlet side, than they are at the exit side. It is also contemplated within the scope of the invention that irregular shaped exit bores can be accommodated. The critical parameter is that the surface area of the horn be sufficient to be capable of being positioned over the exit bore shape, whether the exit bore is that of the reactor or that of the die.

The effective devulcanization of the rubber requires a careful analysis of the die inlet bore diameter, the die exit bore diameter and the ultrasonic horn diameter. In order to effectively devulcanize the material, it is critical that the horn diameter be larger than the die inlet bore, yet smaller than the die exit bore. This arrangement permits the die to be inserted to a depth into the die exit bore which effectively devulcanizes the material, yet simultaneously does not generate an inordinate amount of pressure within the die of the reactor, thereby causing the horn to stop vibrating.

While in accordance with the patent statutes, a preferred embodiment and best mode has been presented, the scope of the invention is not limited thereto, but rather is measure by the scope of the attached claims.

What is claimed is:

1. An ultrasonic reactor comprising:
   (a) a reactor having at least one reactor exit bore capable of continuously feeding vulcanized or crosslinked elastomeric particles under pressure to the reactor exit bore;
   (b) at least one ultrasonic horn;
   (c) at least one attachment means for attaching each ultrasonic horn to the reactor and in a linear relationship to a longitudinal axis of the reactor exit bore;
   (d) an ultrasonic wave generator at one end of each ultrasonic horn, a diameter of the wave generator being larger than the diameter of the reactor exit bore, the ultrasonic wave generator additionally being positioned at a clearance distance as measured along a longitudinal axis between a transverse plane demarking a termination of the reactor exit bore and a transverse plane demarking a tip of the ultrasonic wave generator, sufficient to effect devulcanization or decrosslinking of the elastomer.

2. The reactor of claim 1 wherein the clearance distance is 0.2 mm to 0.8 mm.

3. The reactor of claim 1 wherein at least one ultrasonic horn is in a non-linear alignment to the longitudinal axis of the reactor.

4. An ultrasonic reactor comprising:
   (a) a reactor having at least one reactor exit bore capable of continuously feeding vulcanized or crosslinked elastomeric particles under pressure to the reactor exit bore;
   (b) at least one die having a die entrance bore and a die exit bore, the die entrance bore being of smaller diameter than the die exit bore, the die being attached to the reactor so as to permit the passage of the vulcanized elastomeric particles from the reactor exit bore into the die entrance bore;
   (c) an ultrasonic horn for each die;
   (d) at least one attachment means adapted to attaching the ultrasonic horn to each die and in a linear relationship to a longitudinal axis of the entrance bore of die;
   (e) an ultrasonic wave generator at one end of each horn, a diameter of the wave generator being larger than the diameter of the die entrance bore and smaller than the diameter of the die exit bore, the ultrasonic wave generator additionally being positioned at a clearance distance as measured in a longitudinal axis between a transverse plane demarking a termination of the die entrance bore and a transverse plane demarking a tip of the ultrasonic wave generator, sufficient to effect devulcanization of the decrosslinking of the elastomer.

5. The reactor of claim 4 wherein the clearance distance is 0.2 mm to 0.8 mm.

6. The reactor of claim 4 wherein at least one ultrasonic horn is in a non-linear alignment to the longitudinal axis of the reactor.

7. An ultrasonic reactor comprising:
   (a) a reactor having at least one reactor exit bore capable of continuously feeding vulcanized or crosslinked elastomeric particles under a pressure to the reactor exit bore;
   (b) at least one die having a die entrance bore, a die exit bore and an internal die void connecting the die entrance and exit bores, the die being attached to the reactor so as to permit the passage of the vulcanized elastomeric particles from the reactor exit bore into the die entrance bore;
   (c) at least one ultrasonic horn adapted for insertion into each die void, each due void configured so as to be in a non-linear alignment with a longitudinal axis of the reactor;
   (d) at least one attachment means adapted to attaching each ultrasonic horn into the due void and in a linear relationship to a longitudinal axis of the die exit bore;
   (e) at least one gasket for sealingly engaging each ultrasonic horn to the die; and
   (f) an ultrasonic wave generator at one end of each horn, a diameter of the wave generator being larger than the diameter of the die exit bore, the ultrasonic wave generator additionally being positioned at a clearance distance as measured in a longitudinal axis between a transverse plane demarking a termination of the ultrasonic wave generator tip and a transverse plane demarking the beginning of the die exit bore, sufficient to effect devulcanization of decrosslinking of the elastomer.

8. The reactor of claim 7 wherein the clearance distance is 0.2 mm to 0.8 mm.

9. An ultrasonic reactor comprising:
   (a) a reactor having at least one reactor exit bore capable of continuously feeding vulcanized or crosslinked elastomeric particles under a pressure to the reactor exit bore;
   (b) at least one die having a die entrance bore, a die exit bore and an internal die void connecting the die entrance and exit bores, the die being attached to the reactor so as to permit the passage of the vulcanized elastomeric particles from the reactor exit bore into the die entrance bore;
   (c) at least one ultrasonic horn adapted for insertion into each die void, each die void configured so as to be in a non-linear alignment with a longitudinal axis of the reactor;
   (d) at least one attachment means adapted to attaching each ultrasonic horn to the die void and in a linear relationship to a longitudinal axis of the die exit bore;
   (e) at least one gasket for sealingly engaging each ultrasonic horn to the die; and
   (f) an ultrasonic wave generator at one end of each horn, a diameter of the wave generator being larger than the diameter of the die exit bore, the ultrasonic wave generator additionally being positioned at a clearance distance as measured in a longitudinal axis between a transverse plane demarking a termination of the ultrasonic wave generator tip and a transverse plane demarking the beginning of the die exit bore, sufficient to effect devulcanization of the elastomer.

10. The reactor of claim 9 wherein the clearance distance is 0.2 mm to 0.8 mm.

11. An ultrasonic reactor comprising:
   (a) a reactor having at least one reactor exit bore capable of continuously feeding vulcanized or crosslinked elastomeric particles under pressure to the reactor exit bore;
   (b) a die chamber having at least two parallel-spaced die walls attached to the reactor and to a die exit wall, at least two parallel-spaced ultrasonic wave generator surfaces of two ultrasonic horns, in associative contact with the two die walls and die exit wall, creating a channel through which elastomeric particles can be fed and exited through an exit bore in an exit wall;
   (c) at least two spacing means for attaching each ultrasonic horn to the die walls and permitting variable positioning of the ultrasonic wave generator surfaces in a linear relationship to a longitudinal axis of the reactor exit bore, thereby creating a clearance distance as measured between the two parallel wave generator surfaces sufficient to effect devulcanization or decrosslinking of the elastomer.

12. The reactor of claim 11 wherein the clearance distance is 0.2 mm to 1.6 mm.

13. An ultrasonic reactor comprising:
   (a) a reactor having at least one reactor exit bore capable of continuously feeding vulcanized or crosslinked elastomeric particles under pressure to the reactor exit bore;
   (b) a die chamber having at least a first two parallel-spaced die walls attached to the reactor and to a die exit wall, at least one ultrasonic wave generator surface of at least one ultrasonic horn in a parallel-spaced relationship with a third die wall, both the wave generator surface and third die wall in associative contact with the first two parallel-spaced die walls and die exit wall, creating a channel through which elastomeric particles can be fed and exited through an exit bore in an exit wall;
   (c) at least one spacing means for attaching the ultrasonic horn to the die wall and permitting variable positioning of the ultrasonic wave generator surfaces in a linear relationship to a longitudinal axis of the reactor exit bore, thereby creating a clearance distance as measured between the wave generator surface and third wall sufficient to effect devulcanization of decrosslinking of the elastomer.

14. The reactor of claim 13 wherein the clearance distance is 0.2 mm to 0.8 mm.

* * * * *